(12) United States Patent
Tsai et al.

(10) Patent No.: US 9,331,590 B2
(45) Date of Patent: May 3, 2016

(54) DEVICE AND METHOD FOR DETECTING AN AVERAGE OUTPUT CURRENT OF A POWER CONVERTER

(71) Applicant: Leadtrend Technology Corp., Hsin-Chu (TW)

(72) Inventors: Meng-Jen Tsai, Hsin-Chu (TW); Chih-Chi Chang, Hsin-Chu (TW); Ming-Chang Tsou, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 209 days.

(21) Appl. No.: 14/164,238

(22) Filed: Jan. 26, 2014

(65) Prior Publication Data

US 2014/0211511 A1    Jul. 31, 2014

(30) Foreign Application Priority Data

Jan. 31, 2013   (TW) .............................. 102103791 A
Apr. 18, 2013   (TW) .............................. 102113811 A

(51) Int. Cl.
*H02M 1/08*     (2006.01)
*H02M 3/335*    (2006.01)
*H02M 1/32*     (2007.01)
*H02M 1/00*     (2006.01)
*H02H 7/122*    (2006.01)

(52) U.S. Cl.
CPC ............ *H02M 3/33523* (2013.01); *H02M 1/32* (2013.01); *H02H 7/1227* (2013.01); *H02M 2001/0009* (2013.01); *H02M 2001/0019* (2013.01)

(58) Field of Classification Search
CPC .......... H02M 1/08; H02M 2001/0009; H02M 1/0025
USPC .................................................... 363/95, 97
See application file for complete search history.

(56) References Cited

U.S. PATENT DOCUMENTS

| 6,304,467 | B1 | 10/2001 | Nebrigic | |
|---|---|---|---|---|
| 7,148,659 | B2 | 12/2006 | Lanni | |
| 7,483,279 | B2 | 1/2009 | Lee | |
| 2012/0313646 | A1* | 12/2012 | Nishikawa | H02M 1/4225 324/415 |
| 2014/0211511 | A1* | 7/2014 | Tsai | H02M 1/32 363/15 |
| 2014/0328099 | A1* | 11/2014 | Lin | H02M 3/33523 363/97 |
| 2014/0361755 | A1* | 12/2014 | Tateishi | H02M 3/158 323/271 |
| 2015/0069990 | A1* | 3/2015 | Feldtkeller | H02M 3/158 323/284 |
| 2015/0098256 | A1* | 4/2015 | Lu | H02M 3/33523 363/21.17 |
| 2015/0115922 | A1* | 4/2015 | Liu | H03K 7/08 323/282 |
| 2015/0222171 | A1* | 8/2015 | Nguyen | H02M 1/08 323/282 |

FOREIGN PATENT DOCUMENTS

TW            201138278          11/2011

* cited by examiner

*Primary Examiner* — Jeffrey Sterrett

(74) *Attorney, Agent, or Firm* — Winston Hsu; Scott Margo

(57) ABSTRACT

A device for detecting an average output current of a power converter includes a current generation unit, a first voltage generation unit, a first current mirror unit, and a second current mirror unit. The current generation unit generates a first charge current according to an intermediate voltage. The first voltage generation unit generates a first node voltage according to the first charge current, a first discharge current, a turning-on time, and an inverse turning-on time. The first current mirror unit generates a first current according to the first node voltage, and generates a second voltage corresponding to the average output current of a secondary side of the power converter according to the first current. The second current mirror unit generates the first discharge current according to the first current.

32 Claims, 11 Drawing Sheets

DEVICE AND METHOD FOR DETECTING AN AVERAGE OUTPUT CURRENT OF A POWER CONVERTER

BACKGROUND OF THE INVENTION

1. Field of the Invention

The present invention relates to a device for detecting an average output current of a power converter and a method for detecting an average output current of a power converter, and particularly to a device and a method that can get dynamic information corresponding to the average output current of a secondary side of the power converter in time.

2. Description of the Prior Art

Please refer to FIG. 1 and FIG. 2. FIG. 1 is a diagram illustrating a power converter 100 according to the prior art, and FIG. 2 is a diagram illustrating a gate control signal GCS, a current IP flowing through a primary side PRI of the power converter 100 when a secondary side of the power converter 100 is coupled to a heavy load, and the current IP flowing through the primary side PRI of the power converter 100 when the secondary side of the power converter 100 is coupled to a light load. As shown in FIG. 1, the controller can detect the current IP flowing through the primary side PRI through a current sensing pin CSP, and generate the gate control signal GCS according to the current IP and a detection voltage VD generated by a detection resistor RS. Then, the controller can transmit the gate control signal GCS through a gate pin GATE to a power switch 102 of the primary side PRI of the power converter 100 to control turning-on and turning-off of the power switch 102.

As shown in FIG. 2, the power converter 100 can calculate output power POUTDCM when the secondary side of the power converter 100 is coupled to the light load and output power POUTCCM when the secondary side of the power converter 100 is coupled to the heavy load respectively according to a principle of conservation of energy, equation (1), and equation (2):

$$POUTDCM = \eta \times PIN = \eta \times \frac{1}{2} \times LP \times IPP^2 \times \frac{1}{T} \quad (1)$$

$$POUTCCM = \eta \times PIN = \eta \times \frac{1}{2} \times LP \times (IPP - IPL)^2 \times \frac{1}{T} \quad (2)$$

As shown in equation (1), $\eta$ is a constant, PIN is input power of the primary side PRI of the power converter 100, LP is an inductor of the primary side PRI of the power converter 100, IPP is a maximum value of the current IP flowing through the primary side PRI during the enabled gate control signal GCS, and T is a period of the gate control signal GCS. As shown in equation (2), IPL is a minimum value of the current IP flowing through the primary side PRI during the enabled gate control signal GCS.

As shown in equation (1) and equation (2), because the output power POUTDCM and the output power POUTCCM of the power converter 100 can be influenced by the inductor LP of the primary side PRI of the power converter 100 and the period T of the gate control signal GCS, accuracy of the output power POUTDCM and the output power POUTCCM of the power converter 100 is lower.

SUMMARY OF THE INVENTION

An embodiment provides a controller for detecting an output current of a power converter. The controller includes a comparison unit and an intermediate voltage generation unit. The comparison unit is used for generating a first variable turning-on time according to a detection voltage, an intermediate voltage, and a turning-on time of a power switch of a primary side of the power converter, where a second variable turning-on time is equal to the turning-on time minus the first variable turning-on time. The intermediate voltage generation unit is coupled to the comparison unit, a charge current, and a discharge current for adjusting the intermediate voltage according to the first variable turning-on time, the second variable turning-on time, the turning-on time, the charge current, and the discharge current, wherein the output current corresponds to the intermediate voltage.

Another embodiment provides a device for detecting an average output current of a power converter. The device includes a current generation unit, a first voltage generation unit, a first current mirror unit, and a second current mirror unit. The current generation unit is used for generating a first charge current according to an intermediate voltage, where the intermediate voltage corresponds to the average output current of a secondary side of the power converter. The first voltage generation unit is coupled to the current generation unit for generating a first node voltage according to the first charge current, a first discharge current, a discharge time, and an inverse discharge time. The first current mirror unit is coupled to the first voltage generation unit for generating a first current according to the first node voltage, and generating a second voltage according to the first current, where the second voltage corresponds to the average output current of the secondary side of the power converter. The second current mirror unit is coupled to the first current mirror unit for generating the first discharge current according to the first current.

Another embodiment provides a method for detecting an average output current of a power converter. The method includes generating a first charge current according to an intermediate voltage, where the intermediate voltage corresponds to the average output current of a secondary side of the power converter; generating a first node voltage according to the first charge current, a first discharge current, a discharge time, and an inverse discharge time; generating a first current according to the first node voltage; generating the first discharge current according to the first current; and generating a second voltage according to the first current, where the second voltage corresponds to the average output current of the secondary side of the power converter.

Another embodiment provides a method for detecting an output current of a power converter. The method includes setting an intermediate voltage to be between a maximum value and a minimum value of a detection voltage during a turning-on time of a power switch of a primary side of the power converter when the power converter is powered on; generating a first variable turning-on time according to the detection voltage, the intermediate voltage, and the turning-on time, where a second variable turning-on time is equal to the turning-on time minus the first variable turning-on time; and adjusting the intermediate voltage according to the first variable turning-on time, the second variable turning-on time, the turning-on time, a charge current, and a discharge current, where the output current corresponds to the intermediate voltage.

The present invention provides a device for detecting an average output current of a power converter and a method for detecting the average output current of the power converter. The device and the method utilize a current generation unit to generate a first charge current according to an intermediate voltage generated by an intermediate voltage generation unit, utilize a first voltage generation unit to generate a first node voltage according to the first charge current, a first discharge current, a discharge time, and an inverse discharge time, utilize a first current mirror unit to generate a first current according to the first node voltage and generate a second voltage according to the first current, and utilize a second current mirror unit to generate the first discharge current according to the first current, where the second voltage corresponds to the average output current of the secondary side of the power converter when charges stored by a fourth capacitor of the first voltage generation unit during the discharge time are equal to charges released by the fourth capacitor and a fifth capacitor of the first voltage generation unit during the inverse discharge time. Thus, compared to the prior art, the present invention can detect the average output current of the secondary side of the power converter in time, so the present invention can get dynamic information corresponding to the average output current of the secondary side of the power converter in time. Therefore, the present invention not only can detect the average output current of the secondary side of the power converter in time, but can also limit a detection voltage of a primary side of the power converter or execute over-current protection on the primary side of the power converter according to the second voltage corresponding to the average output current of the secondary side of the power converter.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
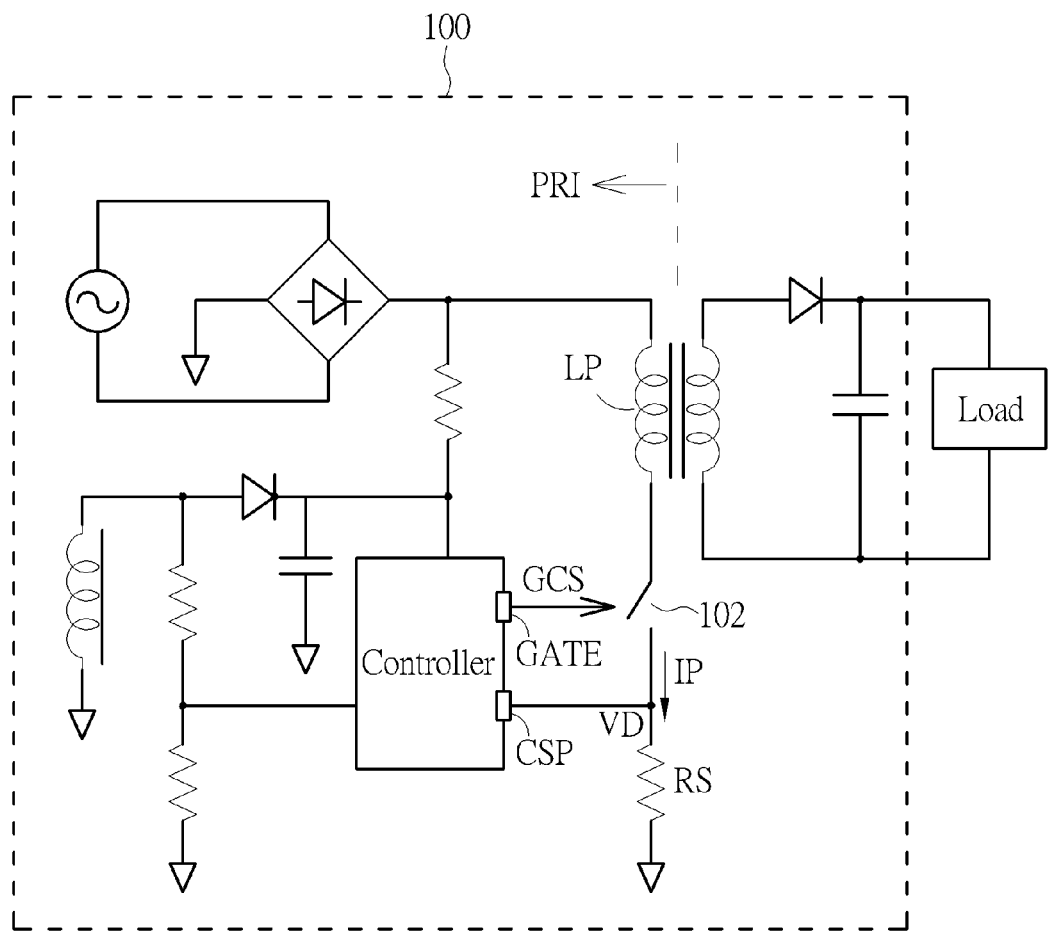
FIG. 1 is a diagram illustrating a power converter according to the prior art.
Figure 2:
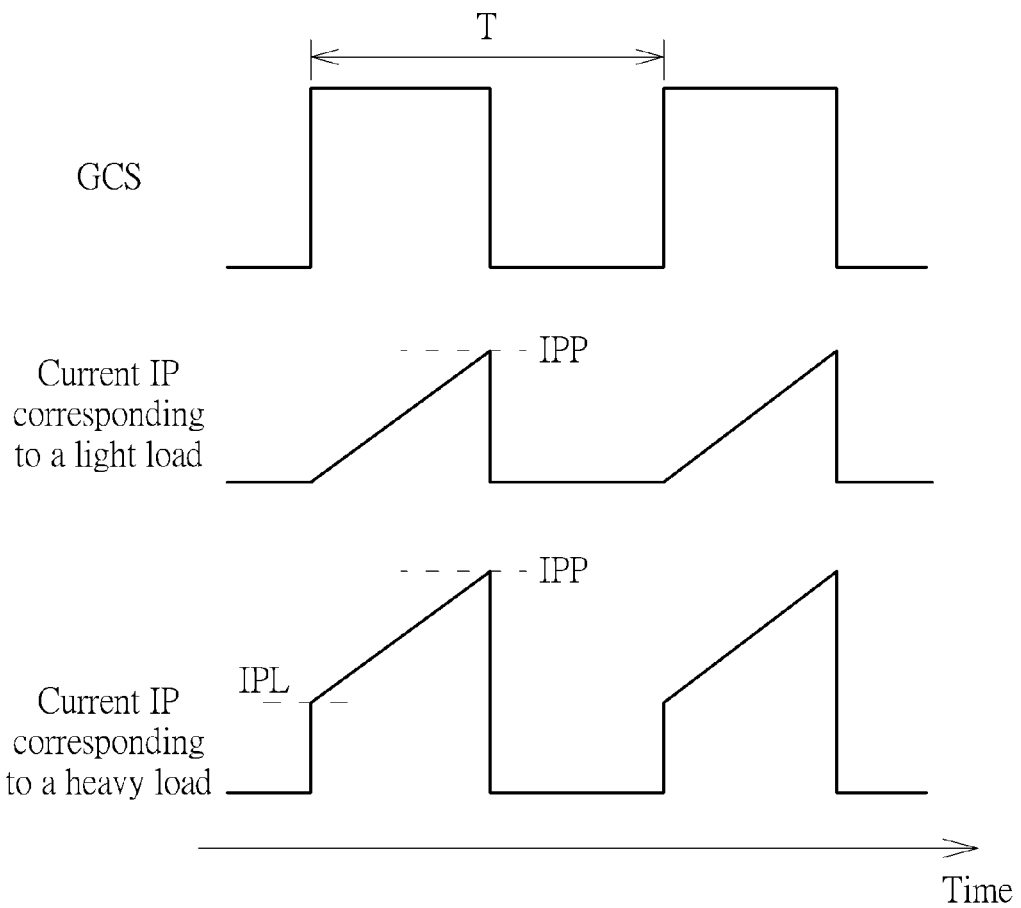
FIG. 2 is a diagram illustrating a gate control signal, a current flowing through a primary side of the power converter when a secondary side of the power converter is coupled to a heavy load, and the current flowing through the primary side of the power converter when the secondary side of the power converter is coupled to a light load.
Figure 3:
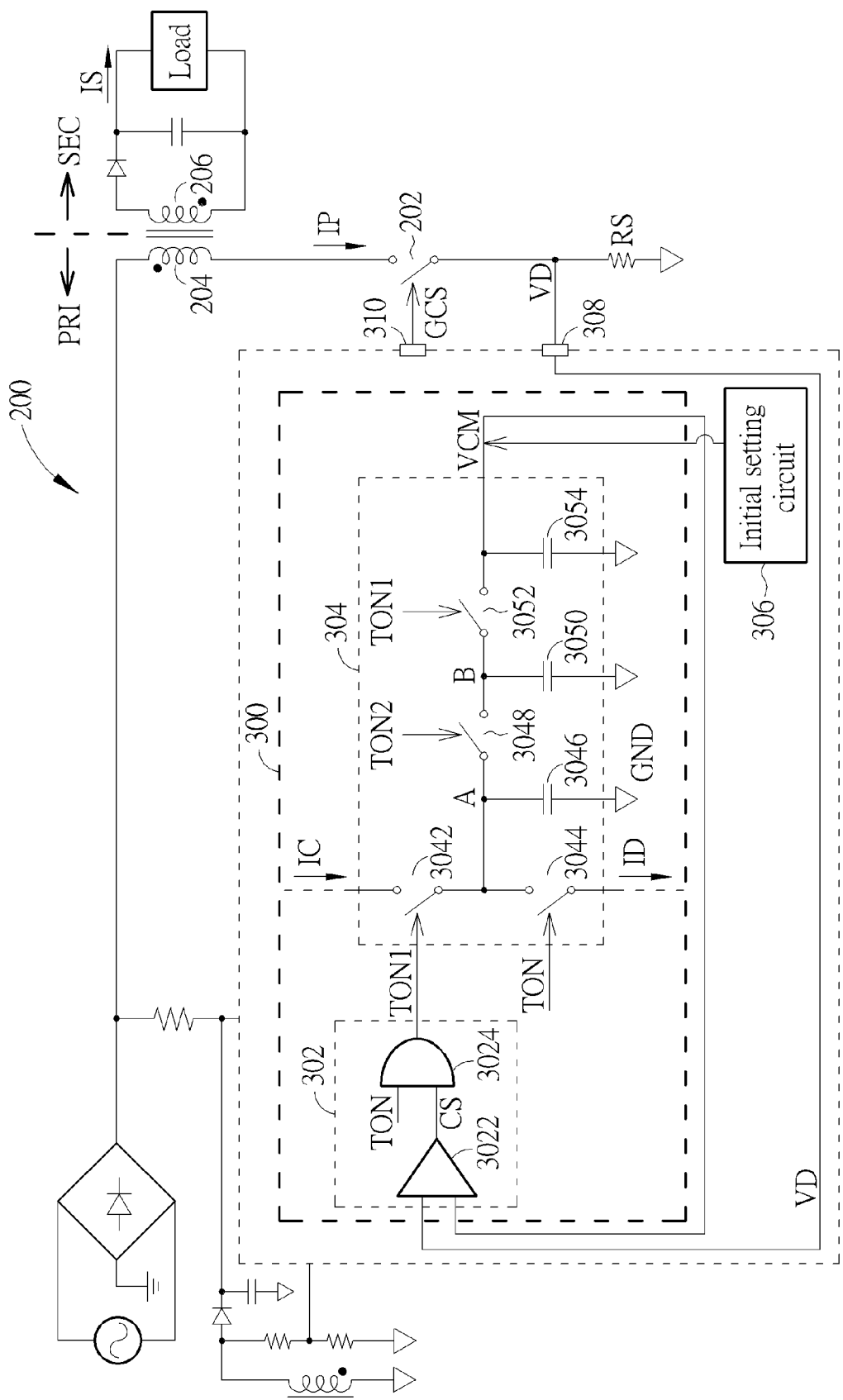
FIG. 3 is a diagram illustrating a controller for detecting an output current of a power converter according to an embodiment.

Please refer to FIG. 3. FIG. 3 is a diagram illustrating a controller 300 for detecting an output current of a power converter 200 according to an embodiment. As shown in FIG. 3, the controller 300 includes a comparison unit 302 and an intermediate voltage generation unit 304. The comparison unit 302 is used for generating a first variable turning-on time TON1 according to a detection voltage VD, an intermediate voltage VCM, and a turning-on time TON of a power switch 202 of a primary side PRI of the power converter 200, where a second variable turning-on time TON2 is equal to the turning-on time TON minus the first variable turning-on time TON1. The intermediate voltage generation unit 304 is coupled to the comparison unit 302, a charge current IC, and a discharge current ID for adjusting the intermediate voltage VCM according to the first variable turning-on time TON1, the second variable turning-on time TON2, the charge current IC, and the discharge current ID, where the output current of a secondary side SEC of the power converter 200 corresponds to the intermediate voltage VCM, and the charge current IC is greater than the discharge current ID (e.g. the charge current IC is two times to the discharge current ID). In addition, the controller 300 further includes an initial setting circuit 306 and a current sensing pin 308, where the current sensing pin 308 is used for generating the detection voltage VD according to a current IP flowing through the primary side PRI of the power converter 200.

As shown in FIG. 3, the comparison unit 302 includes a comparator 3022 and an AND gate 3024. The comparator 3022 is used for generating a comparison signal CS according to the detection voltage VD and the intermediate voltage VCM. The AND gate 3024 is used for generating the first variable turning-on time TON1 according to the comparison signal CS and the turning-on time TON. The intermediate voltage generation unit 304 includes a first switch 3042, a second switch 3044, a first capacitor 3046, a third switch 3048, a second capacitor 3050, a fourth switch 3052, and a third capacitor 3054. The first switch 3042 is coupled to the charge current IC for being turned on and turned off according to the first variable turning-on time TON1. The second switch 3044 is coupled between the discharge current ID and the first switch 3042 for being turned on and turned off according to the turning-on time TON. The first capacitor 3046 is coupled to the first switch 3042, the second switch 3044, and ground GND. The third switch 3048 is coupled to the first switch 3042, the second switch 3044, and the first capacitor 3046 for being turned on and turned off according to the second variable turning-on time TON2. The second capacitor 3050 is coupled to the third switch 3048 and the ground GND. The fourth switch 3052 is coupled to the third switch 3048 and the second capacitor 3050 for being turned on and turned off according to the first variable turning-on time TON1. The third capacitor 3054 is coupled to the fourth switch 3052 and the ground GND.

Figure 4:
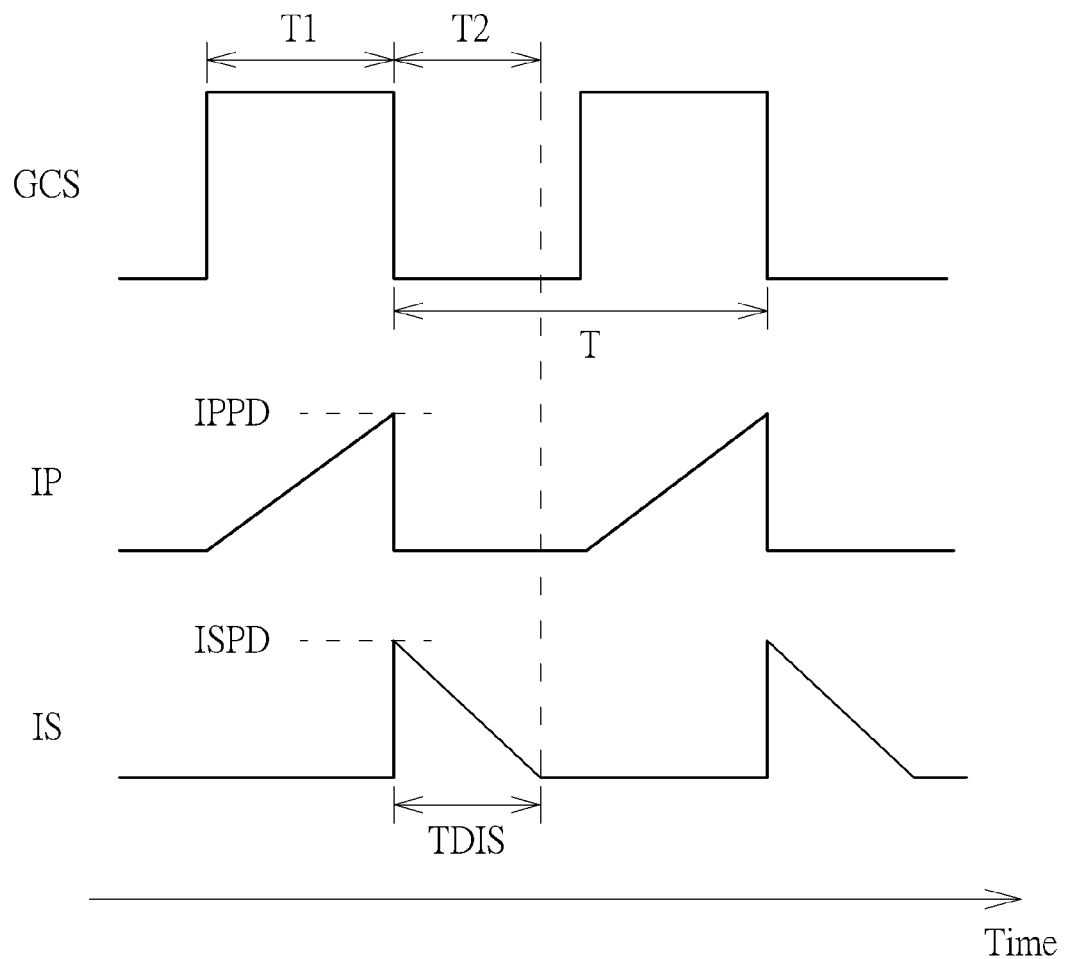
FIG. 4 is a diagram illustrating a gate control signal for controlling turning-on and turning-off of the power switch and the current of the primary side and an output current of the secondary side when the secondary side of the power converter is coupled to a light load.
Figure 5:
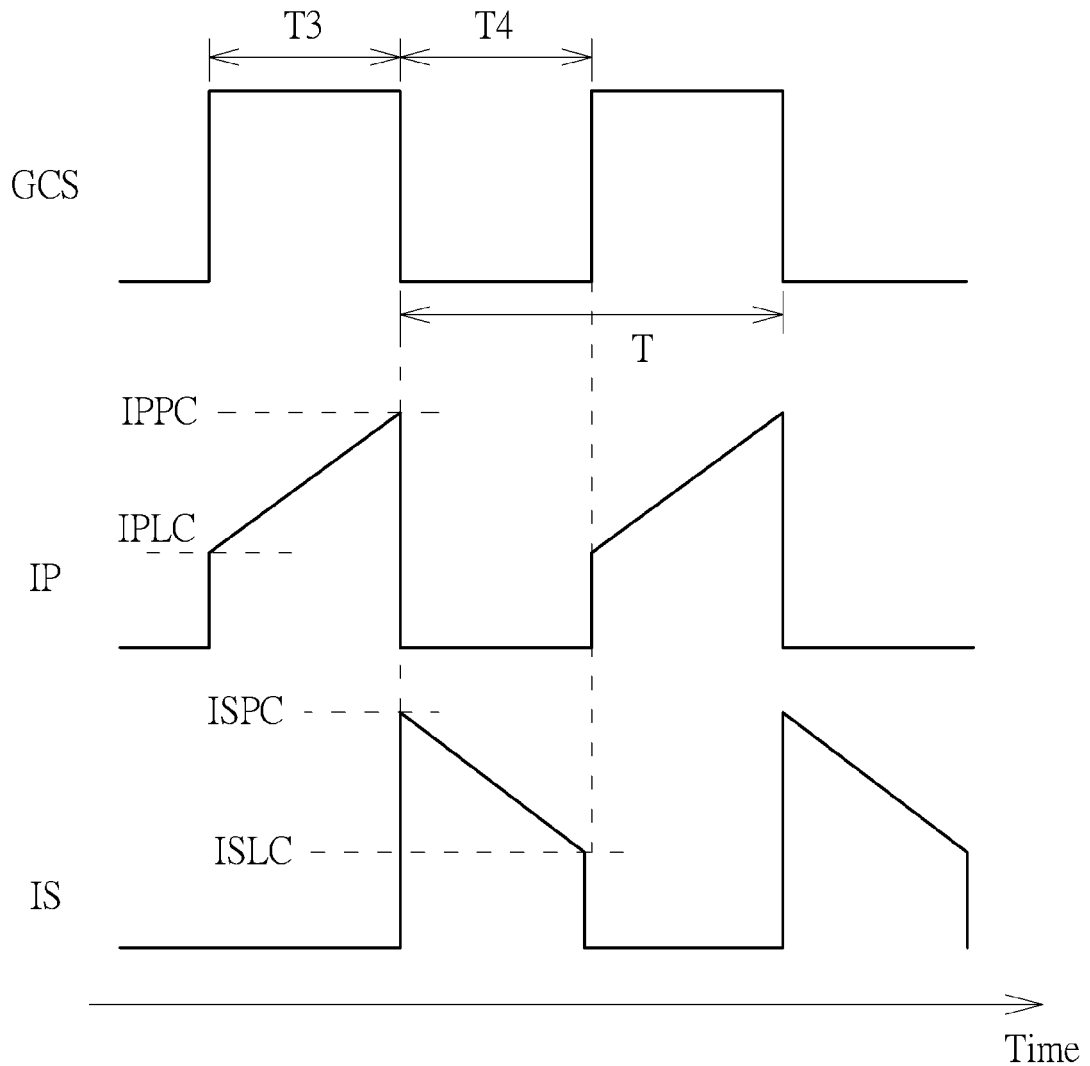
FIG. 5 is a diagram illustrating the gate control signal for controlling turning-on and turning-off of the power switch and the current of the primary side and the output current of the secondary side when the secondary side of the power converter is coupled to a heavy load.

Please refer to FIG. 4 and FIG. 5. FIG. 4 is a diagram illustrating a gate control signal GCS for controlling turning-on and turning-off of the power switch 202 and the current IP of the primary side PRI and an output current IS of the secondary side SEC when the secondary side SEC of the power converter 200 is coupled to a light load, and FIG. 5 is a diagram illustrating the gate control signal GCS for controlling turning-on and turning-off of the power switch 202 and the current IP of the primary side PRI and the output current IS of the secondary side SEC when the secondary side SEC of the power converter 200 is coupled to a heavy load, where the controller 300 can transmit the gate control signal GCS to the power switch 202 of the primary side PRI of the power converter 200 through a gate pin 310 to control turning-on and turning-off of the power switch 202. As shown in FIG. 4, during a period T1, the gate control signal GCS is enabled, so the power switch 202 is turned on, resulting in the current IP flowing through the primary side PRI being increased from zero until the gate control signal GCS is disabled, where IPPD is a maximum value of the current IP flowing through the primary side PRI during the period T1. During a period T2, the gate control signal GCS is disabled, so the power switch 202 is turned off, resulting in the current IP flowing through the primary side PRI being instantly decreased to zero, and the output current IS of the secondary side SEC starting to be gradually decreased from a maximum value ISPD to zero. As shown in FIG. 5, during a period T3, the gate control signal GCS is enabled, so the power switch 202 is turned on, resulting in the current IP flowing through the primary side PRI starting to be increased until the gate control signal GCS is disabled, where IPPC is a maximum value of the current IP flowing through the primary side PRI during the period T3, and IPPL is a minimum value of the current IP flowing through the primary side PRI during the period T3. During a period T4, the gate control signal GCS is disabled, so the power switch 202 is turned off, resulting in the current IP flowing through the primary side PRI being decreased to zero instantly, and the output current IS of the secondary side SEC starting to be decreased from a maximum value ISPC to a minimum value ISLC. Therefore, as shown in FIG. 4, an average output current can be generated according to equation (3) when the secondary side SEC of the power converter 200 is coupled to the light load:

$$ISD(avg) = \frac{ISPD}{2} \times \frac{TDIS}{T} \quad (3)$$
$$= \frac{NP}{NS} \times \frac{IPPD}{2} \times \frac{TDIS}{T}$$
$$= \frac{NP}{NS} \times \frac{VDP}{2 \times RS} \times \frac{TDIS}{T}$$

As shown in equation (3), ISD(avg) is an average value of the output current IS when the secondary side SEC of the power converter 200 is coupled to the light load, TDIS is a discharge time of the secondary side SEC, T is a period of the gate control signal GCS, $$\frac{NP}{NS}$$

is a turn ratio of a coil 204 of the primary side PRI to a coil 206 of the secondary side SEC, VDP is a maximum value of the detection voltage VD when the secondary side SEC of the power converter 200 is coupled to the light load, and RS is a detection resistor of the primary side PRI.

In addition, as shown in FIG. 5, the average output current can be generated according to equation (4) when the secondary side SEC of the power converter 200 is coupled to the heavy load:

$$ISC(avg) = \frac{ISPC + ISLC}{2} \times \frac{TDIS}{T} \quad (4)$$
$$= \frac{NP}{NS} \times \frac{IPPC + IPLC}{2} \times \frac{TDIS}{T}$$
$$= \frac{NP}{NS} \times \frac{VCP + VCL}{2 \times RS} \times \frac{TDIS}{T}$$

As shown in equation (4), ISC(avg) is an average value of the output current IS when the secondary side SEC of the power converter 200 is coupled to the heavy load, VCP is a maximum value of the detection voltage VD when the secondary side SEC of the power converter 200 is coupled to the heavy load, and VCL is a minimum value of the detection voltage VD when the secondary side SEC of the power converter 200 is coupled to the heavy load.

Figure 6:
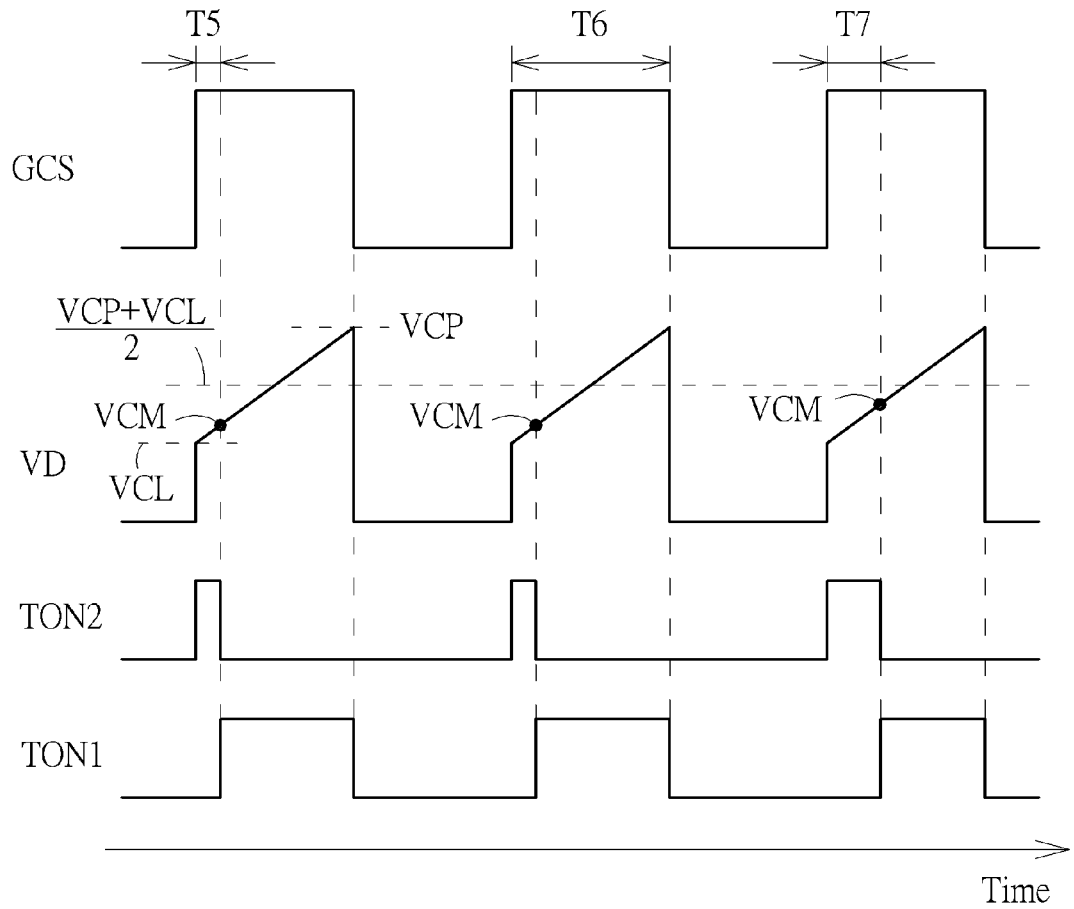
FIG. 6 and FIG. 7 are diagrams illustrating the intermediate voltage generated by the intermediate voltage generation unit when the secondary side of the power converter is coupled to the heavy load.
Figure 7:
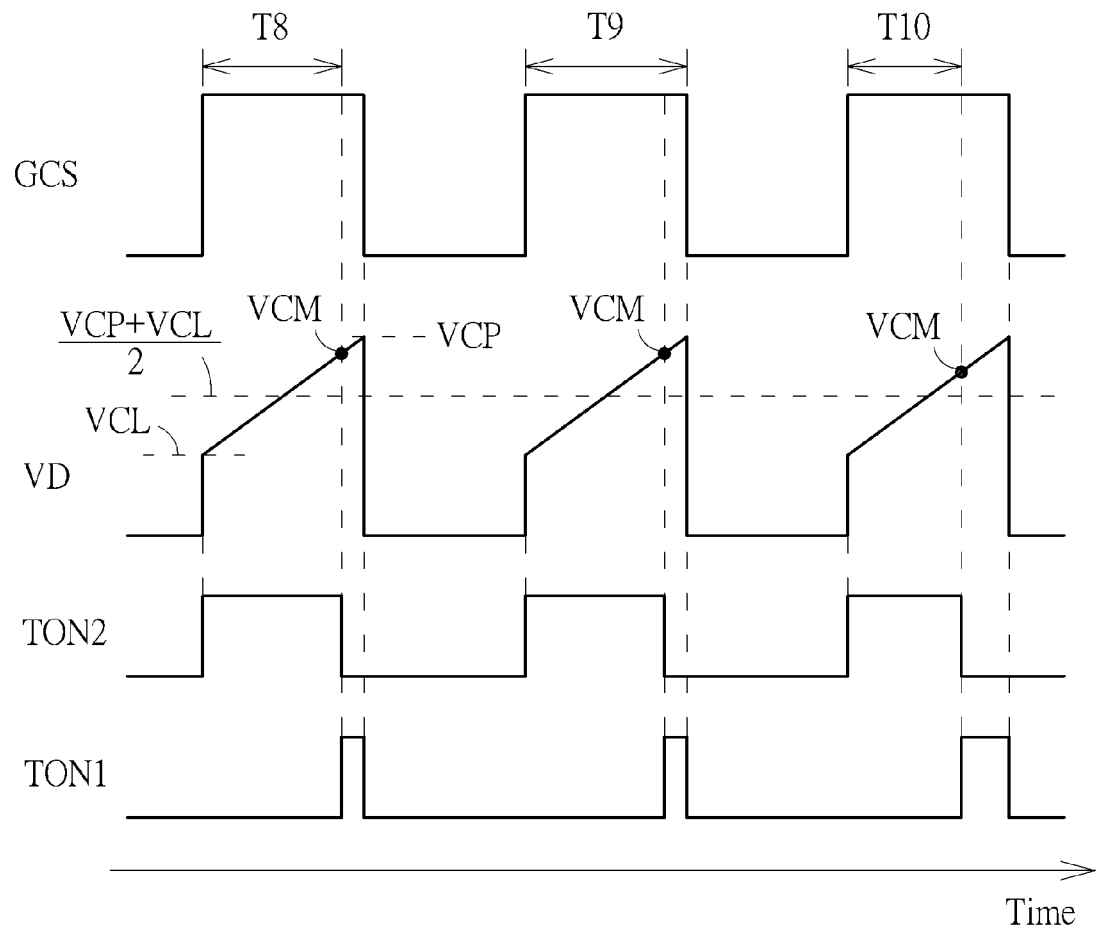

Please refer to FIG. 6 and FIG. 7. FIG. 6 and FIG. 7 are diagrams illustrating the intermediate voltage VCM generated by the intermediate voltage generation unit 304 when the secondary side SEC of the power converter 200 is coupled to the heavy load, where the initial setting circuit 306 is used for setting the intermediate voltage VCM to be between the maximum value VCP of the detection voltage VD and the minimum value VCL of the detection voltage VD when the power converter 200 is powered on. As shown in FIG. 3 and FIG. 6, during a period T5, the comparison unit 302 is used for generating the first variable turning-on time TON1 according to the detection voltage VD, the intermediate voltage VCM, and the turning-on time TON of the power switch 202 of the primary side PRI of the power converter 200 when the intermediate voltage VCM is less than a half of a sum of the maximum value VCP of the detection voltage VD and the minimum value VCL of the detection voltage VD, where the first variable turning-on time TON1 is greater than the second variable turning-on time TON2 (as shown in FIG. 6). As shown in FIG. 3, because the first variable turning-on time TON1 is greater than the second variable turning-on time TON2 and the charge current IC is greater than the discharge current ID, the intermediate voltage generation unit 304 charges the first capacitor 3046 to increase a voltage VA (greater than intermediate voltage VCM) of a node A according to the first variable turning-on time TON1, the turning-on time TON, the charge current IC, and the discharge current ID. Then, during a period T6, the voltage VA can charge the second capacitor 3050 (that is, the voltage VA is transmitted to a node B) through the enabled second variable turning-on time TON2, and a voltage VB of the node B can charge the third capacitor 3054 (that is, the intermediate voltage VCM is equal to the voltage VB) through the enabled first variable turning-on time TON1. Meanwhile, the intermediate voltage VCM is increased. Therefore, during a period T7, because the intermediate voltage VCM is less than the half of the sum of the maximum value VCP of the detection voltage VD and the minimum value VCL of the detection voltage VD, the comparison unit 302 generates the first variable turning-on time TON1 (less than the first variable turning-on time TON1 during the period T5) according to the detection voltage VD, the intermediate voltage VCM, and the turning-on time TON of the power switch 202 of the primary side PRI of the power converter 200. Thus, the intermediate voltage generation unit 304 can execute the above mentioned steps repeatedly until the first variable turning-on time TON1 is equal to the second variable turning-on time TON2. Meanwhile, the intermediate voltage VCM is equal to the half of the sum of the maximum value VCP and the minimum value VCL of the detection voltage VD during the turning-on time TON. As shown in FIG. 3 and FIG. 7, during a period T8, the first variable turning-on time TON1 is less than second variable turning-on time TON2 when the intermediate voltage VCM is greater than the half of the sum of the maximum value VCP of the detection voltage VD and the minimum value VCL of the detection voltage VD. As shown in FIG. 3, because the first variable turning-on time TON1 is less than the second variable turning-on time TON2, the intermediate voltage generation unit 304 discharges the first capacitor 3046 to decrease the voltage VA (less than intermediate voltage VCM) of the node A according to the first variable turning-on time TON1, the turning-on time TON, the charge current IC, and the discharge current ID. Then, during a period T9, the voltage VA can charge the second capacitor 3050 (that is, the voltage VA is transmitted to the node B) through the enabled second variable turning-on time TON2, and the voltage VB of the node B can charge the third capacitor 3054 (that is, the intermediate voltage VCM is equal to the voltage VB) through the enabled first variable turning-on time TON1. Meanwhile, the intermediate voltage VCM is decreased. Therefore, during a period T10, because the intermediate voltage VCM is greater than the half of the sum of the maximum value VCP of the detection voltage VD and the minimum value VCL of the detection voltage VD, the comparison unit 302 generates the first variable turning-on time TON1 (greater than the first variable turning-on time TON1 during the period T8) according to the detection voltage VD, the intermediate voltage VCM, and the turning-on time TON of the power switch 202 of the primary side PRI of the power converter 200. Thus, the intermediate voltage generation unit 304 can execute the above mentioned steps repeatedly until the first variable turning-on time TON1 is equal to the second variable turning-on time TON2. Meanwhile, the intermediate voltage VCM is equal to the half of the sum of the maximum value VCP and the minimum value VCL of the detection voltage VD during the turning-on time TON. In addition, operation principles of the controller 300 generating the intermediate voltage VCM when the secondary side SEC of the power converter 200 is coupled to the light load are the same as operation principles of the controller 300 generating the intermediate voltage VCM when the secondary side SEC of the power converter 200 is coupled to the heavy load, so further description thereof is omitted for simplicity.

Figure 8:
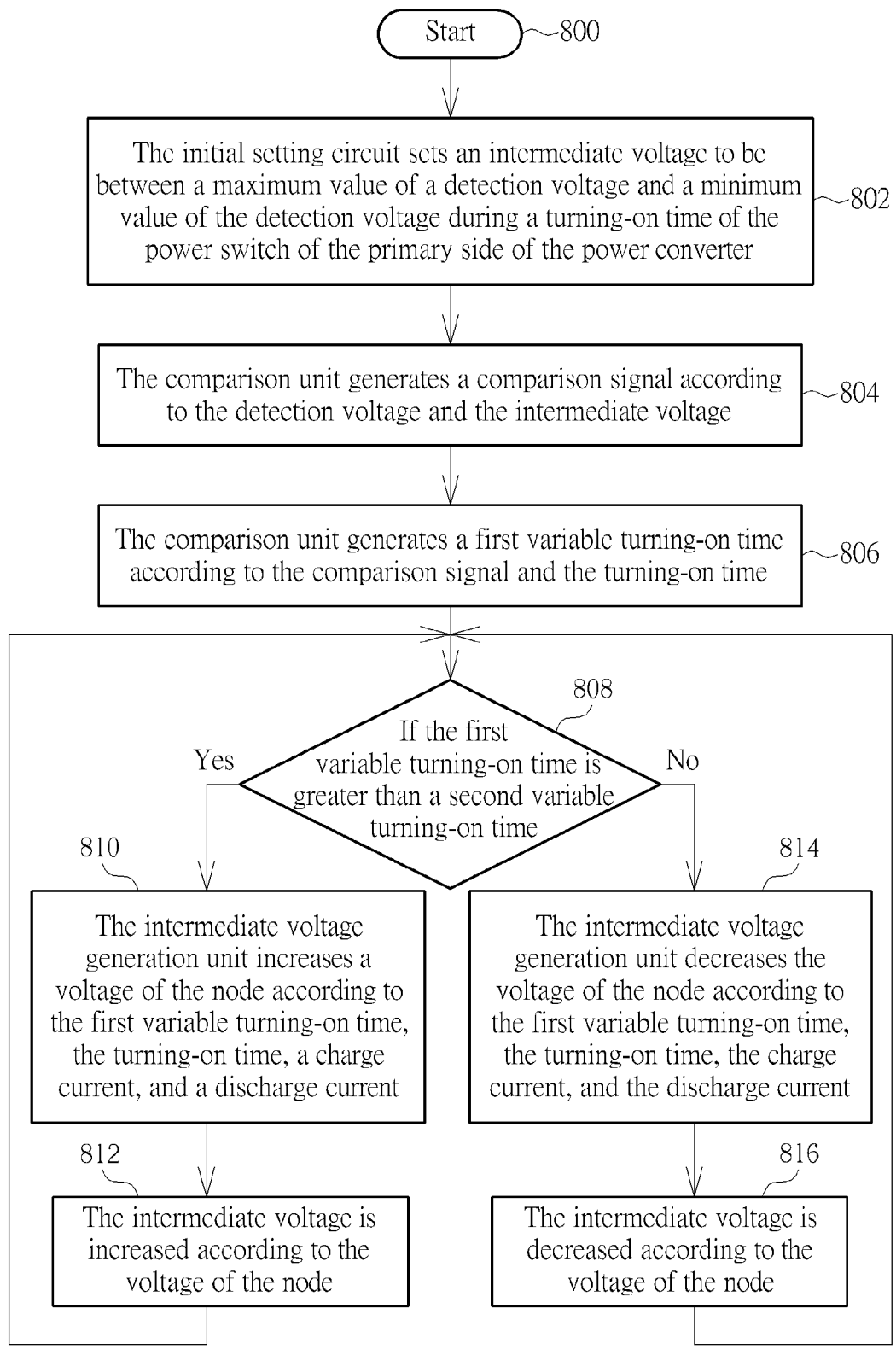
FIG. 8 is a flowchart illustrating a method for detecting an output current of a power converter according to another embodiment.

Please refer to FIG. 3, FIG. 6, FIG. 7, and FIG. 8. FIG. 8 is a flowchart illustrating a method for detecting an output current of a power converter according to another embodiment. The method in FIG. 8 is illustrated using the controller 300 in FIG. 3. Detailed steps are as follows:

Step 800: Start.

Step 802: The initial setting circuit 306 sets an intermediate voltage VCM to be between a maximum value VCP of a detection voltage VD and a minimum value VCL of the detection voltage VD during a turning-on time TON of the power switch 202 of the primary side PRI of the power converter 200.

Step 804: The comparison unit 302 generates a comparison signal CS according to the detection voltage VD and the intermediate voltage VCM.

Step 806: The comparison unit 302 generates a first variable turning-on time TON1 according to the comparison signal CS and the turning-on time TON.

Step 808: If the first variable turning-on time TON1 is greater than a second variable turning-on time TON2; if yes, go to Step 810; if no, go to Step 814.

Step 810: The intermediate voltage generation unit 304 increases a voltage VA of the node A according to the first variable turning-on time TON1, the turning-on time TON, a charge current IC, and a discharge current ID.

Step 812: The intermediate voltage VCM is increased according to the voltage VA of the node A, go to Step 808.

Step 814: The intermediate voltage generation unit 304 decreases the voltage VA of the node A according to the first variable turning-on time TON1, the turning-on time TON, the charge current IC, and the discharge current ID.

Step 816: The intermediate voltage VCM is decreased according to the voltage VA of the node A, go to Step 808.

In Step 802, the initial setting circuit 306 is used for setting the intermediate voltage VCM to be between the maximum value VCP of the detection voltage VD and the minimum value VCL of the detection voltage VD when the power converter 200 is powered on. In Step 804 and Step 806, as shown in FIG. 3, the comparator 3022 generates the comparison signal CS according to detection voltage VD and the intermediate voltage VCM. The AND gate 3024 generates the first variable turning-on time TON1 according to the comparison signal CS and the turning-on time TON. In Step 810, as shown in FIG. 3 and FIG. 6, the comparison unit 302 generates the first variable turning-on time TON1 according to the detection voltage VD, the intermediate voltage VCM, and the turning-on time TON of the power switch 202 of the primary side PRI of the power converter 200 when the intermediate voltage VCM is less than a half of a sum of the maximum value VCP of the detection voltage VD and the minimum value VCL of the detection voltage VD during the period T5, where the first variable turning-on time TON1 is greater than the second variable turning-on time TON2 (as shown in FIG. 6). As shown in FIG. 3, because the first variable turning-on time TON1 is greater than the second variable turning-on time TON2 and the charge current IC is greater than the discharge current ID, the intermediate voltage generation unit 304 charges the first capacitor 3046 to increase the voltage VA of the node A (greater than the intermediate voltage VCM) according to the first variable turning-on time TON1, the turning-on time TON, the charge current IC, and the discharge current ID. In Step 812, during the period T6, the voltage VA can charge the second capacitor 3050 (that is, the voltage VA is transmitted to the node B) through the enabled second variable turning-on time TON2, and the voltage VB of the node B can charge the third capacitor 3054 (that is, the intermediate voltage VCM is equal to the voltage VB) through the enabled first variable turning-on time TON1. Meanwhile, the intermediate voltage VCM is increased. Therefore, during the period T7, because the intermediate voltage VCM is less than the half of the sum of the maximum value VCP of the detection voltage VD and the minimum value VCL of the detection voltage VD, the comparison unit 302 generates the first variable turning-on time TON1 (less than the first variable turning-on time TON1 during the period T5) according to the detection voltage VD, the intermediate voltage VCM, and the turning-on time TON of the power switch 202 of the primary side PRI of the power converter 200. Thus, the intermediate voltage generation unit 304 can execute Step 810 and Step 812 repeatedly until the first variable turning-on time TON1 is equal to the second variable turning-on time TON2. Meanwhile, the intermediate voltage VCM is equal to the half of the sum of the maximum value VCP and the minimum value VCL of the detection voltage VD during the turning-on time TON. In Step 814, as shown in FIG. 3 and FIG. 7, the first variable turning-on time TON1 is less than the second variable turning-on time TON2 when the intermediate voltage VCM is greater than the half of the sum of the maximum value VCP of the detection voltage VD and the minimum value VCL of the detection voltage VD during the period T8. As shown in FIG. 3, because the first variable turning-on time TON1 is less than the second variable turning-on time TON2, the intermediate voltage generation unit 304 discharges the first capacitor 3046 to decrease the voltage VA of the node A (less than intermediate voltage VCM) according to the first variable turning-on time TON1, the turning-on time TON, the charge current IC, and the discharge current ID. In Step 816, during the period T9, the voltage VA can charge the second capacitor 3050 (that is, the voltage VA is transmitted to the node B) through the enabled second variable turning-on time TON2, and the voltage VB of the node B can charge the third capacitor 3054 (that is, the intermediate voltage VCM is equal to the voltage VB) through the enabled first variable turning-on time TON1. Meanwhile, the intermediate voltage VCM is decreased. Therefore, during the period T10, because the intermediate voltage VCM is greater than the half of the sum of the maximum value VCP of the detection voltage VD and the minimum value VCL of the detection voltage VD, the comparison unit 302 generates the first variable turning-on time TON1 (greater than the first variable turning-on time TON1 during the period T8) according to the detection voltage VD, the intermediate voltage VCM, and the turning-on time TON of the power switch 202 of the primary side PRI of the power converter 200. Thus, the intermediate voltage generation unit 304 can execute Step 814 and Step 816 repeatedly until the first variable turning-on time TON1 is equal to the second variable turning-on time TON2. Meanwhile, the intermediate voltage VCM is equal to the half of the sum of the maximum value VCP and the minimum value VCL of the detection voltage VD during the turning-on time TON.

Figure 9:
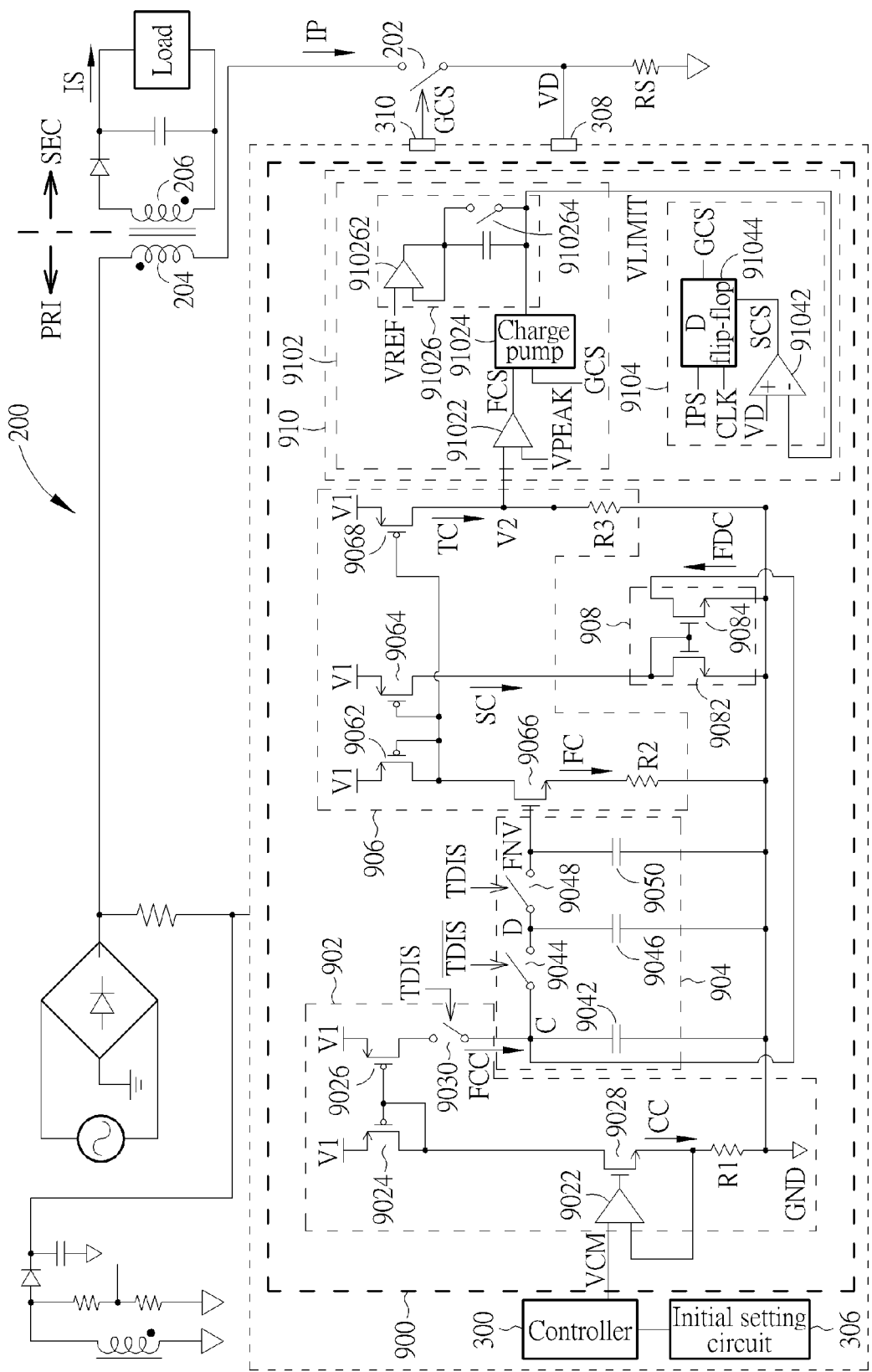
FIG. 9 is a diagram illustrating a device for detecting an average output current of a power converter according to another embodiment.

Please refer to FIG. 9. FIG. 9 is a diagram illustrating a device 900 for detecting an average output current of a power converter according to another embodiment. The device 900 includes a current generation unit 902, a first voltage generation unit 904, a first current mirror unit 906, and a second current mirror unit 908. The current generation unit 902 is used for generating a first charge current FCC according to the intermediate voltage VCM generated by the intermediate voltage generation unit 304 in FIG. 3. As shown in FIG. 6 and FIG. 7, because the intermediate voltage VCM is equal to the half of the sum of the maximum value VCP and the minimum value VCL of the detection voltage VD during the turning-on time TON, the intermediate voltage VCM corresponds to an average output current (e.g. the average output current ISC (avg) when the secondary side SEC of the power converter 200 is coupled to the heavy load or the average output current ISD(avg) when the secondary side SEC of the power converter 200 is coupled to the light load) of the secondary side SEC of the power converter 200 as shown in equation (3) and equation (4). The first voltage generation unit 904 is coupled to the current generation unit 902 for generating a first node voltage FNV according to the first charge current FCC, a first discharge current FDC, the discharge time TDIS of the secondary side SEC of the power converter 200, and an inverse discharge time $\overline{TDIS}$, where the first charge current FCC is greater than the first discharge current FDC. The first current mirror unit 906 is coupled to the first voltage generation unit 904 for generating a first current FC according to the first node voltage FNV, and generating a second voltage V2 according to the first current FC, where the second voltage V2 corresponds to the average output current of the secondary side SEC of the power converter 200. The second current mirror unit 908 is coupled to the first current mirror unit 906 for generating the first discharge current FDC according to the first current FC.

As shown in FIG. 9, the current generation unit 902 includes an amplifier 9022, a first P-type metal-oxide-semiconductor transistor 9024, a second P-type metal-oxide-semiconductor transistor 9026, a first N-type metal-oxide-semiconductor transistor 9028, a first resistor R1, and a fifth switch 9030. The amplifier 9022 has a first input terminal for receiving the intermediate voltage VCM, a second input terminal, and an output terminal. The first P-type metal-oxide-semiconductor transistor 9024 has a first terminal for receiving a first voltage V1, a second terminal, and a third terminal coupled to the second terminal of the first P-type metal-oxide-semiconductor transistor 9024. The second P-type metal-oxide-semiconductor transistor 9026 has a first terminal for receiving the first voltage V1, a second terminal coupled to the second terminal of the first P-type metal-oxide-semiconductor transistor 9024, and a third terminal. The first N-type metal-oxide-semiconductor transistor 9028 has a first terminal coupled to the third terminal of the first P-type metal-oxide-semiconductor transistor 9024, a second terminal coupled to the output terminal of the amplifier 9022, and a third terminal coupled to the second input terminal of the amplifier 9022. The first resistor R1 has a first terminal coupled to the second input terminal of the amplifier 9022, and a second terminal coupled to the ground GND, where the first resistor R1 generates a corresponding current CC according to the intermediate voltage VCM and equation (5), and the first charge current FCC is a first predetermined times $K_U$ (as shown in equation (6)) to the corresponding current CC:

$$CC = \frac{VCM}{R1} \quad (5)$$

$$FCC = K_U \times \frac{VCM}{R1} \quad (6)$$

The fifth switch 9030 has a first terminal coupled to the third terminal of the second P-type metal-oxide-semiconductor transistor 9026, a second terminal for receiving the discharge time TDIS, and a third terminal coupled to the first voltage generation unit 904, where the fifth switch 9030 is turned on and turned off according to the discharge time TDIS.

As shown in FIG. 9, the first voltage generation unit 904 includes a fourth capacitor 9042, a sixth switch 9044, a fifth capacitor 9046, a seventh switch 9048, and a sixth capacitor 9050. The fourth capacitor 9042 has a first terminal coupled to the third terminal of the fifth switch 9030 of the current generation unit 902, and a second terminal coupled to the ground GND. The sixth switch 9044 has a first terminal coupled to the first terminal of the fourth capacitor 9042, a second terminal for receiving the inverse discharge time $\overline{TDIS}$, and a third terminal, where the sixth switch 9044 is turned on and turned off according to the inverse discharge time $\overline{TDIS}$. The fifth capacitor 9046 has a first terminal coupled to the third terminal of the sixth switch 9044, and a second terminal coupled to the ground GND. The seventh switch 9048 has a first terminal coupled to the first terminal of the fifth capacitor 9046, a second terminal for receiving the discharge time TDIS, and a third terminal, where the seventh switch 9048 is turned on and turned off according to the discharge time TDIS. The sixth capacitor 9050 has a first terminal coupled to the third terminal of the seventh switch 9048, and a second terminal coupled to the ground GND.

As shown in FIG. 9, the first current mirror unit 906 includes a third P-type metal-oxide-semiconductor transistor 9062, a fourth P-type metal-oxide-semiconductor transistor 9064, a second N-type metal-oxide-semiconductor transistor 9066, a second resistor R2, a fifth P-type metal-oxide-semiconductor transistor 9068, and a third resistor R3. The third P-type metal-oxide-semiconductor transistor 9062 has a first terminal for receiving the first voltage V1, a second terminal, and a third terminal coupled to the second terminal of the third P-type metal-oxide-semiconductor transistor 9062. The fourth P-type metal-oxide-semiconductor transistor 9064 has a first terminal for receiving the first voltage V1, a second terminal coupled to the second terminal of the third P-type metal-oxide-semiconductor transistor 9062, and a third terminal coupled to the second current mirror unit 908, where the fourth P-type metal-oxide-semiconductor transistor 9064 is used for mirroring the first current FC to generate a second current SC. The second N-type metal-oxide-semiconductor transistor 9066 has a first terminal coupled to the third terminal of the third P-type metal-oxide-semiconductor transistor 9062, a second terminal coupled to the first terminal of the sixth capacitor 9050 of the first voltage generation unit 904, and a third terminal. The second resistor R2 has a first terminal coupled to the third terminal of the second N-type metal-oxide-semiconductor transistor 9066, and a second terminal coupled to the ground GND, where the first current mirror unit 906 can determine the first current FC according to the second resistor R2, the first node voltage FNV, a threshold voltage $Vth_{9066}$ of the second N-type metal-oxide-semiconductor transistor 9066, and equation (7):

$$FC = \frac{FNV - Vth_{9066}}{R2} \quad (7)$$

The fifth P-type metal-oxide-semiconductor transistor 9068 has a first terminal for receiving the first voltage V1, a second terminal coupled to the second terminal of the third P-type metal-oxide-semiconductor transistor 9062, and a third terminal for outputting the second voltage V2, where the fifth P-type metal-oxide-semiconductor transistor 9068 is used for mirroring the first current FC to generate a third current TC, and the third current TC is third predetermined times $K_O$ (as shown in equation (8)) to the first current FC:

$$TC = K_O \times FC \quad (8)$$

The third resistor R3 has a first terminal coupled to the third terminal of the fifth P-type metal-oxide-semiconductor transistor 9068, and a second terminal coupled to the ground GND, where the third resistor R3 generates the second voltage V2 according to the third current TC and equation (9):

$$V2 = R3 \times TC \quad (9)$$

As shown in FIG. 9, the second current mirror unit 908 includes a third N-type metal-oxide-semiconductor transistor 9082 and a fourth N-type metal-oxide-semiconductor transistor 9084. The third N-type metal-oxide-semiconductor transistor 9082 has a first terminal coupled to the third terminal of the fourth P-type metal-oxide-semiconductor transistor 9064 of the first current mirror unit 906 for receiving the second current SC, a second terminal coupled to the first terminal of the third N-type metal-oxide-semiconductor transistor 9082, and a third terminal coupled to the ground GND. The fourth N-type metal-oxide-semiconductor transistor 9084 has a first terminal coupled to the first terminal of the fourth capacitor 9042 of the first voltage generation unit 904, a second terminal coupled to the first terminal of the third N-type metal-oxide-semiconductor transistor 9082, and a third terminal coupled to the ground GND, where the fourth N-type metal-oxide-semiconductor transistor 9084 is used for mirroring the second current SC to generate the first discharge current FDC, and the first discharge current FDC is a second predetermined times K (as shown in equation (10)) to the second current SC:

$$FDC = K \times SC \quad (10)$$

Because the fourth P-type metal-oxide-semiconductor transistor 9064 mirrors the first current FC to generate the second current SC, the first discharge current FDC is a fourth predetermined times $K_D$ (as shown in equation (11)) to the first current FC:

$$\begin{aligned}FDC &= K \times SC \\ &= K \times K_1 \times FC \\ &= K_D \times FC \\ &= K_D \times \frac{FNV - Vth_{9066}}{R2}\end{aligned} \quad (11)$$

As shown in equation (11), $K_1$ is a ratio of the first current FC and the second current SC.

As shown in FIG. 9, when the current generation unit 902 generates the first charge current FCC (meanwhile, the second current mirror unit 908 does not yet generate the first discharge current FDC) according to the intermediate voltage VCM generated by the intermediate voltage generation unit 304 in FIG. 3, equation (5), and equation (6), the first voltage generation unit 904 can charge the fourth capacitor 9042 to increase a voltage of a node C according to the discharge time TDIS and the first charge current FCC. Then, during the inverse discharge time $\overline{TDIS}$, the voltage of the node C can charge the fifth capacitor 9046 (that is, the voltage of the node C is transmitted to a node D) through the turned-on sixth switch 9044. In addition, during the discharge time TDIS, a voltage of the node D can charge the sixth capacitor 9050 (that is, the first node voltage FNV is equal to the voltage of the node D) through the turned-on seventh switch 9048. Meanwhile, the first current mirror unit 906 can generate the first current FC according to the second resistor R2, the first node voltage FNV, the threshold voltage $Vth_{9066}$ of second N-type metal-oxide-semiconductor transistor 9066, and equation (7), and the second current mirror unit 908 can generate the first discharge current FDC according to equation (10) and equation (11).

After the first discharge current FDC is generated, because the first charge current FCC charges the fourth capacitor 9042 (that is, the fourth capacitor 9042 can store charges during the discharge time TDIS) during the discharge time TDIS, and the first discharge current FDC discharges the fourth capacitor 9042 and the fifth capacitor 9046 (that is, the fourth capacitor 9042 and the fifth capacitor 9046 release charges during the inverse discharge time $\overline{TDIS}$) during the inverse discharge time $\overline{TDIS}$, the first node voltage FNV generated by the first voltage generation unit 904 is a fixed value when the charges stored by the fourth capacitor 9042 during the discharge time TDIS are equal to the charges released by the fourth capacitor 9042 and the fifth capacitor 9046 during the inverse discharge time $\overline{TDIS}$.

In addition, equation (9) can be rewritten to equation (12) according to equation (8) and equation (7):

$$V2 = R3 \times TC \quad (12)$$
$$= R3 \times Ko \times FC$$
$$= R3 \times Ko \times \frac{KNV - Vth_{9066}}{R2}$$

In addition, because the charges stored by the fourth capacitor 9042 during the discharge time TDIS are equal to the charges released by the fourth capacitor 9042 and the fifth capacitor 9046 during the inverse discharge time $\overline{TDIS}$, relationships between the discharge time TDIS, the inverse discharge time $\overline{TDIS}$, the first charge current FCC, and the first discharge current FDC can be determined according to equation (13):

$$TDIS \times (FCC - FDC) = \overline{TDIS} \times FDC \quad (13)$$
$$\Rightarrow TDIS \times FCC = (\overline{TDIS} + TDIS) \times FDC$$
$$\Rightarrow TDIS \times FCC = T \times FDC$$
$$\Rightarrow \frac{TDIS}{T} = \frac{FDC}{FCC}$$

As shown in equation (13), T is the period of the gate control signal GCS. Substitute equation (6) and equation (11) into equation (13) to generate equation (14):

$$\frac{TDIS}{T} = \frac{FDC}{FCC} \quad (14)$$
$$\Rightarrow \frac{TDIS}{T} = \frac{K_D \times \frac{FNV - Vth_{9066}}{R2}}{K_U \times \frac{VCM}{R1}}$$
$$\Rightarrow \frac{FNV - Vth_{9066}}{R2} = \frac{TDIS}{T} \times \frac{VCM}{R1} \times \frac{K_U}{K_D}$$

Substitute equation (14) into equation (12) to generate equation (15):

$$V2 = R3 \times TC \quad (15)$$
$$= R3 \times Ko \times FC$$
$$= R3 \times Ko \times \frac{FNV - Vth_{9066}}{R2}$$
$$= R3 \times Ko \times \frac{TDIS}{T} \times \frac{VCM}{R1} \times \frac{K_U}{K_D}$$

Substitute equation (4) into equation (15) to generate equation (16):

$$V2 = R3 \times Ko \times \frac{TDIS}{T} \times \frac{VCM}{R1} \times \frac{K_U}{K_D} \quad (16)$$
$$= R3 \times Ko \times ISC(avg) \times \frac{RS}{R1} \times \frac{K_U}{K_D} \times \frac{NS}{NP}$$

Substitute equation (3) into equation (15) to generate equation (17):

$$V2 = R3 \times Ko \times \frac{TDIS}{T} \times \frac{VCM}{R1} \times \frac{K_U}{K_D} \quad (17)$$
$$= R3 \times Ko \times ISD(avg) \times \frac{RS}{R1} \times \frac{K_U}{K_D} \times \frac{NS}{NP}$$

As shown in equation (16) and equation (17), because the second voltage V2 corresponds to the average output current (e.g. the average output current ISC(avg) when the secondary side SEC of the power converter 200 is coupled to the heavy load or the average output current ISD(avg) when the secondary side SEC of the power converter 200 is coupled to the light load) of the secondary side SEC of the power converter 200, the device 900 can detect the average output current of the secondary side SEC of the power converter 200 in time through the second voltage V2.

As shown in FIG. 9, the device 900 further includes a peak value limiter 910, where the peak value limiter 910 includes a voltage limiting generation circuit 9102 and a gate control signal generator 9104. The voltage limiting generation circuit 9102 includes a first comparator 91022, a charge pump 91024, and a predetermined voltage generator 91026. The first comparator 91022 is used for generating a first comparison signal FCS according to the second voltage V2 and a peak value reference voltage VPEAK. The charge pump 91024 is coupled to the first comparator 91022 for generating a limit voltage VLIMIT according to the first comparison signal FCS and the gate control signal GCS of the power switch 202 of the primary side PRI of the power converter 200. The predetermined voltage generator 91206 is coupled to the charge pump 91024 for setting an output terminal of the charge pump 91024 at a reference voltage VREF through an amplifier 910262 and a switch 910264 according to the reference voltage VREF when the device 900 is powered on, where the switch 910264 is turned on when the device 900 is powered on. Therefore, the voltage limiting generation circuit 9102 can gradually limit a voltage of the output terminal of the charge pump 91024 to the limit voltage VLIMIT through the first comparator 91022 and the charge pump 91024 according to the second voltage V2, the peak value reference voltage VPEAK, and the gate control signal GCS after the device 900 is powered on.

The gate control signal generator 9104 includes a second comparator 91042 and a D flip-flop 91044. The second comparator 91042 is used for generating a second comparison signal SCS according to the detection voltage VD of the primary side PRI of the power converter 200 and the limit voltage VLIMIT. The D flip-flop 91044 is used for generating the gate control signal GCS of the power switch 202 of the primary side PRI of the power converter 200 according to the second comparison signal SCS, a clock CLK, and an input signal IPS. Therefore, as shown in FIG. 9, the peak value limiter 910 can decrease a duty cycle of the gate control signal GCS to reduce the detection voltage VD through the voltage limiting generation circuit 9102 and the gate control signal generator 9104 when the detection voltage VD of the primary side PRI of the power converter 200 is greater than the limit voltage VLIMIT.

Figure 10:
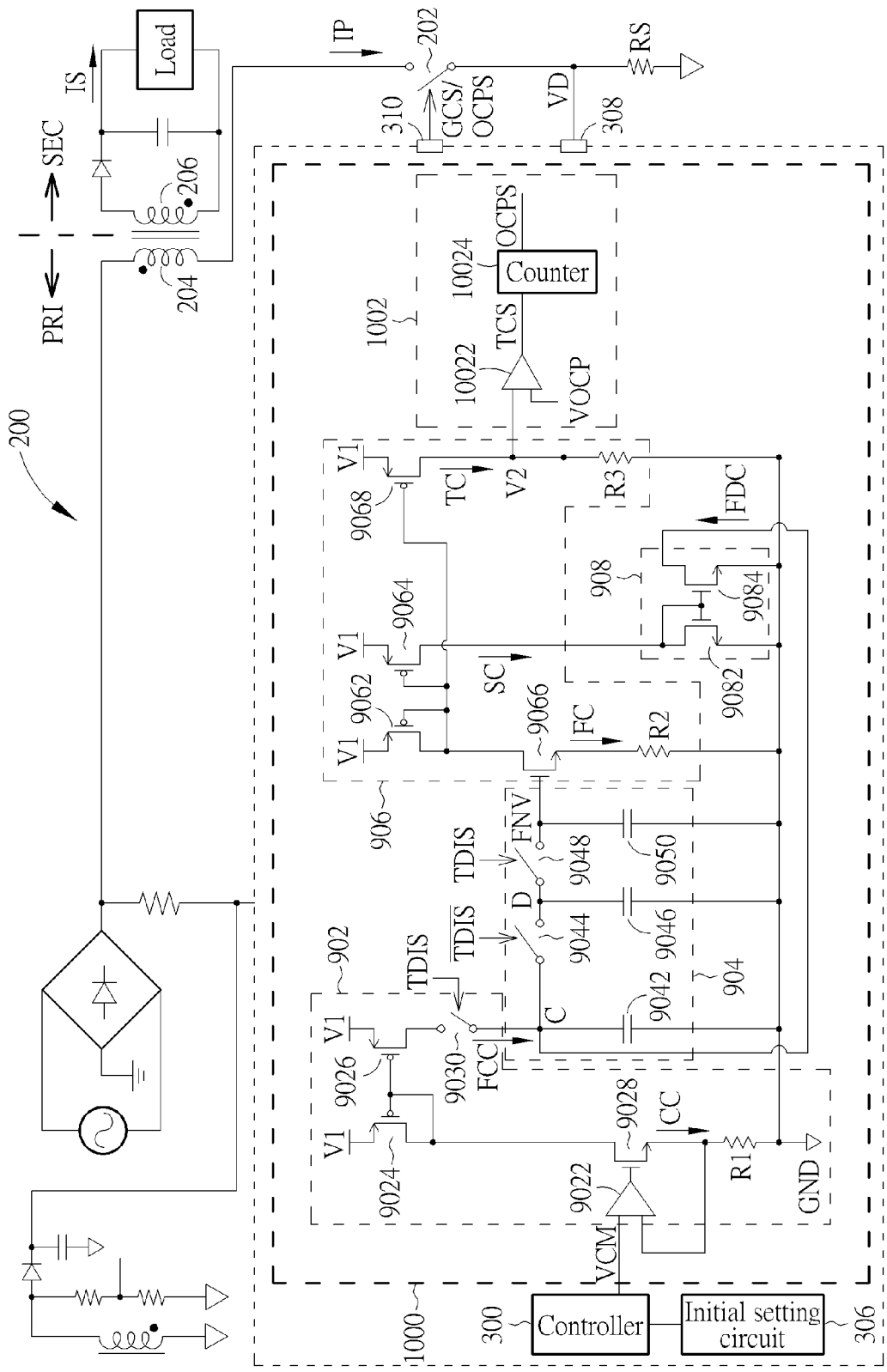
FIG. 10 is a diagram illustrating a device for detecting an average output current of a power converter according to another embodiment.

Please refer to FIG. 10. FIG. 10 is a diagram illustrating a device 1000 for detecting an average output current of a power converter according to another embodiment. A difference between the device 1000 and the device 900 is that the device 1000 includes an over-current protection unit 1002, and does not include the peak value limiter 910. The over-current protection unit 1002 includes a third comparator 10022 and a counter 10024. The third comparator 10022 is used for generating a third comparison signal TCS according to an over-current protection voltage VOCP and the second voltage V2. The counter 10024 is used for counting the third comparison signal TCS and generating an over-current protection signal OCPS accordingly to the power switch 202 of the primary side PRI of the power converter 200. Therefore, as shown in FIG. 10, the counter 10024 can generate the over-current protection signal OCPS to the power switch 202 of the primary side PRI of the power converter 200 when a number of the second voltage V2 being greater than over-current protection voltage VOCP is greater than a predetermined value (that is, a number of the third comparison signal TCS counted by the counter 10024 is greater than the predetermined value). However, it is noted that the counter 10024 does not change the duty cycle of the gate control signal GCS.

Figure 11:
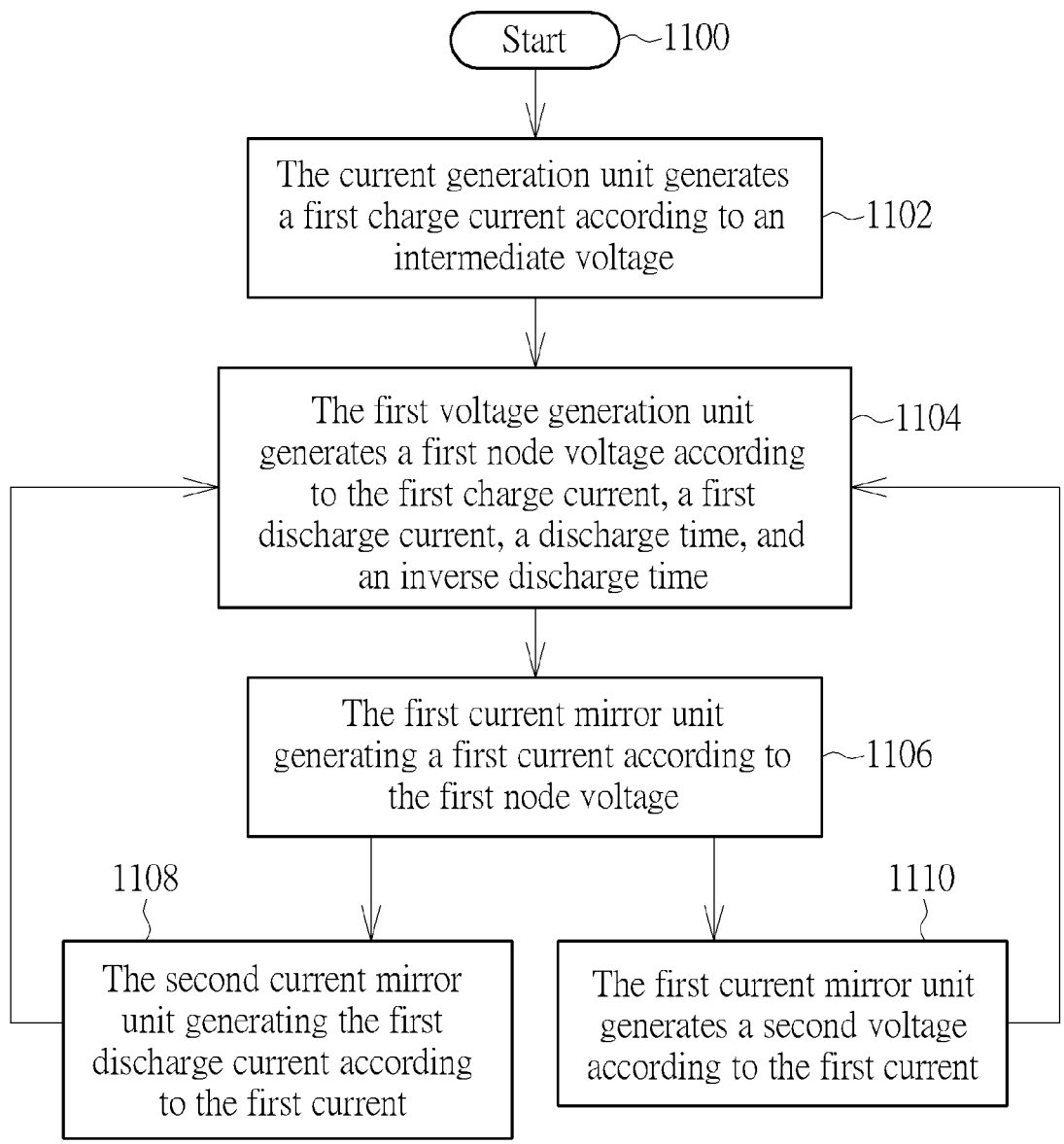
FIG. 11 is a flowchart illustrating a method for detecting an average output current of a power converter according to another embodiment.

Please refer to FIG. 9, FIG. 10, and FIG. 11. FIG. 11 is a flowchart illustrating a method for detecting an average output current of a power converter according to another embodiment. The method in FIG. 11 is illustrated using the device 900 in FIG. 9 and the device 1000 in FIG. 10. Detailed steps are as follows:

Step 1100: Start.

Step 1102: The current generation unit 902 generates a first charge current FCC according to an intermediate voltage VCM.

Step 1104: The first voltage generation unit 904 generates a first node voltage FNV according to the first charge current FCC, a first discharge current FDC, a discharge time TDIS, and an inverse discharge time $\overline{TDIS}$.

Step 1106: The first current mirror unit 906 generating a first current FC according to the first node voltage FNV.

Step 1108: The second current mirror unit 908 generating the first discharge current FDC according to the first current FC, go to Step 1104.

Step 1110: The first current mirror unit 906 generates a second voltage V2 according to the first current FC, go to Step 1104.

In Step 1102, the current generation unit 902 generates the first charge current FCC according to the intermediate voltage VCM generated by the intermediate voltage generation unit 304 in FIG. 3. As shown in FIG. 6 and FIG. 7, because the intermediate voltage VCM is equal to the half of the sum of the maximum value VCP and the minimum value VCL of the detection voltage VD during the turning-on time TON, as shown in equation (3) and equation (4), the intermediate voltage VCM corresponds to the average output current of the secondary side SEC of the power converter 200 (e.g. the average output current ISC(avg) when the secondary side SEC of the power converter 200 is coupled to the heavy load or the average output current ISD(avg) when the secondary side SEC of the power converter 200 is coupled to the light load). In Step 1104, because the first charge current FCC charges the fourth capacitor 9042 (that is, the fourth capacitor 9042 can store charges during the discharge time TDIS) during the discharge time TDIS, and the first discharge current FDC discharges the fourth capacitor 9042 and the fifth capacitor 9046 (that is, the fourth capacitor 9042 and the fifth capacitor 9046 release charges during the inverse discharge time $\overline{TDIS}$) during the inverse discharge time $\overline{TDIS}$, the first node voltage FNV generated by the first voltage generation unit 904 is a fixed value when the charges stored by the fourth capacitor 9042 during the discharge time TDIS are equal to the charges released by the fourth capacitor 9042 and the fifth capacitor 9046 during the inverse discharge time $\overline{TDIS}$. In Step 1106, after the first node voltage FNV is generated, the first current mirror unit 906 can generate the first current FC according to the second resistor R2, the first node voltage FNV, the threshold voltage $Vth_{9066}$ of the second N-type metal-oxide-semiconductor transistor 9066, and equation (7). In Step 1108, after the first node voltage FNV is generated, the second current mirror unit 908 can generate the first discharge current FDC according to equation (10) and equation (11). In Step 1110, after the first node voltage FNV is generated, the first current mirror unit 906 can generate the second voltage V2 according to the third resistor R3, the third current TC, and equation (9), where the second voltage V2 corresponds to the average output current of the secondary side SEC of the power converter 200 (as shown in equation (16) and equation (17)), and the third current TC is the third predetermined times $K_O$ (as shown in equation (8)) to the first current FC.

As shown in equation (16) and equation (17), because the second voltage V2 corresponds to the average output current (e.g. the average output current ISC(avg) when the secondary side SEC of the power converter 200 is coupled to the heavy load or the average output current ISD(avg) when the secondary side SEC of the power converter 200 is coupled to the light load) of the secondary side SEC of the power converter 200, the device 900 can detect the average output current of the secondary side SEC of the power converter 200 in time through the second voltage V2.

As shown in FIG. 9, the voltage limiting generation circuit 9102 can gradually limit the voltage of the output terminal of the charge pump 91024 to the limit voltage VLIMIT through the first comparator 91022 and the charge pump 91024 according to the second voltage V2, the peak value reference voltage VPEAK, and the gate control signal GCS after the device 900 is powered on. In addition, the peak value limiter 910 can decrease a duty cycle of the gate control signal GCS to reduce the detection voltage VD through the voltage limiting generation circuit 9102 and the gate control signal generator 9104 when the detection voltage VD of the primary side PRI of the power converter 200 is greater than the limit voltage VLIMIT.

As shown in FIG. 10, after the second voltage V2 is generated, the counter 10024 can generate the over-current protection signal OCPS to the power switch 202 of the primary side PRI of the power converter 200 when a number of the second voltage V2 being greater than over-current protection voltage VOCP is greater than a predetermined value (that is, a number of the third comparison signal TCS counted by the counter 10024 is greater than the predetermined value). However, it is noted that the counter 10024 does not change the duty cycle of the gate control signal GCS.

To sum up, the device for detecting the average output current of the power converter and the method for detecting the average output current of the power converter utilize the current generation unit to generate the first charge current according to the intermediate voltage generated by the intermediate voltage generation unit, utilize the first voltage generation unit to generate first node voltage according to the first charge current, the first discharge current, the discharge time, and the inverse discharge time, utilize the first current mirror unit to generate the first current according to the first node voltage and generate the second voltage according to the first current, and utilize the second current mirror unit to generate the first discharge current according to the first current, where the second voltage corresponds to the average output current of the secondary side of the power converter when the charges stored by the fourth capacitor of the first voltage generation unit during the discharge time are equal to the charges released by the fourth capacitor and the fifth capacitor of the first voltage generation unit during the inverse discharge time. Thus, compared to the prior art, the present invention can detect the average output current of the secondary side of the power converter in time, so the present invention can get dynamic information corresponding to the average output current of the secondary side of the power converter in time. Therefore, the present invention not only can detect the average output current of the secondary side of the power converter in time, but can also limit the detection voltage of the primary side of the power converter or execute over-current protection on the primary side of the power converter according to the second voltage corresponding to the average output current of the secondary side of the power converter.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A controller for detecting an output current of a power converter, the controller comprising:
    a comparison unit for generating a first variable turning-on time according to a detection voltage, an intermediate voltage, and a turning-on time of a power switch of a primary side of the power converter, wherein a second variable turning-on time is equal to the turning-on time minus the first variable turning-on time; and
    an intermediate voltage generation unit coupled to the comparison unit, a charge current, and a discharge current for adjusting the intermediate voltage according to the first variable turning-on time, the second variable turning-on time, the turning-on time, the charge current, and the discharge current, wherein the output current corresponds to the intermediate voltage.

2. The controller of claim 1, wherein the intermediate voltage is equal to a half of a sum of a maximum value and a minimum value of the detection voltage during the turning-on time when the first variable turning-on time is equal to the second variable turning-on time.

3. The controller of claim 2, further comprising:
    an initial setting circuit for setting the intermediate voltage to be between the maximum value and the minimum value when the power converter is powered on.

4. The controller of claim 1, wherein when the intermediate voltage is greater than a half of a sum of a maximum value and a minimum value of the detection voltage during the turning-on time, the first variable turning-on time is less than the second variable turning-on time, and when the intermediate voltage is less than the half of the sum of the maximum value and the minimum value, the first variable turning-on time is greater than the second variable turning-on time.

5. The controller of claim 4, wherein when the first variable turning-on time is greater than the second variable turning-on time, the intermediate voltage generation unit increases the intermediate voltage according to the first variable turning-on time, the turning-on time, the charge current, and the discharge current; when the first variable turning-on time is less than the second variable turning-on time, the intermediate voltage generation unit decreases the intermediate voltage according to the first variable turning-on time, the turning-on time, the charge current, and the discharge current.

6. The controller of claim 1, wherein the charge current is greater than the discharge current.

7. The controller of claim 1, wherein the intermediate voltage generation unit comprises:
    a first switch coupled to the charge current for being turned on and turned off according to the first variable turning-on time;
    a second switch coupled between the discharge current and the first switch for being turned on and turned off according to the turning-on time;
    a first capacitor coupled to the first switch, the second switch, and ground;
    a third switch coupled to the first switch, the second switch, and the first capacitor for being turned on and turned off according to the second variable turning-on time;
    a second capacitor coupled to the third switch and the ground;
    a fourth switch coupled to the third switch and the second capacitor for being turned on and turned off according to the first variable turning-on time; and
    a third capacitor coupled to the fourth switch and the ground.

8. The controller of claim 1, wherein the comparison unit comprises:
    a comparator for generating a comparison signal according to the detection voltage and the intermediate voltage; and
    an AND gate for generating the first variable turning-on time according to the comparison signal and the turning-on time.

9. The controller of claim 1, further comprising:
    a current sensing pin for generating the detection voltage according to a current flowing through the primary side of the power converter.

10. A device for detecting an average output current of a power converter, the device comprising:
    a current generation unit for generating a first charge current according to an intermediate voltage, wherein the intermediate voltage corresponds to the average output current of a secondary side of the power converter;
    a first voltage generation unit coupled to the current generation unit for generating a first node voltage according to the first charge current, a first discharge current, a discharge time, and an inverse discharge time;
    a first current mirror unit coupled to the first voltage generation unit for generating a first current according to the first node voltage, and generating a second voltage according to the first current, wherein the second voltage corresponds to the average output current of the secondary side of the power converter; and
    a second current mirror unit coupled to the first current mirror unit for generating the first discharge current according to the first current.

11. The device of claim 10, wherein the discharge time is a discharge time of the secondary side of the power converter.

12. The device of claim 10, wherein the first charge current is greater than the first discharge current.

13. The device of claim 10, wherein the current generation unit comprises:
    an amplifier having a first input terminal for receiving the intermediate voltage, a second input terminal, and an output terminal;
    a first P-type metal-oxide-semiconductor transistor having a first terminal for receiving a first voltage, a second terminal, and a third terminal coupled to the second terminal of the first P-type metal-oxide-semiconductor transistor;
    a second P-type metal-oxide-semiconductor transistor having a first terminal for receiving the first voltage, a second terminal coupled to the second terminal of the first P-type metal-oxide-semiconductor transistor, and a third terminal;
    a first N-type metal-oxide-semiconductor transistor having a first terminal coupled to the third terminal of the first P-type metal-oxide-semiconductor transistor, a second terminal coupled to the output terminal of the amplifier, and a third terminal coupled to the second input terminal of the amplifier;

a first resistor having a first terminal coupled to the second input terminal of the amplifier, and a second terminal coupled to ground, wherein the first resistor generates a corresponding current according to the intermediate voltage, and the first charge current is a first predetermined times to the corresponding current; and a fifth switch having a first terminal coupled to the third terminal of the second P-type metal-oxide-semiconductor transistor, a second terminal for receiving the discharge time, and a third terminal coupled to the first voltage generation unit, wherein the fifth switch is turned on and turned off according to the discharge time.

14. The device of claim 10, wherein the first voltage generation unit comprises:

a fourth capacitor having a first terminal coupled to the current generation unit, and a second terminal coupled to ground;

a sixth switch having a first terminal coupled to the first terminal of the fourth capacitor, a second terminal for receiving the inverse discharge time, and a third terminal, wherein the sixth switch is turned on and turned off according to the inverse discharge time;

a fifth capacitor having a first terminal coupled to the third terminal of the sixth switch, and a second terminal coupled to the ground;

a seventh switch having a first terminal coupled to the first terminal of the fifth capacitor, a second terminal for receiving the discharge time, and a third terminal, wherein the seventh switch is turned on and turned off according to the discharge time; and a sixth capacitor having a first terminal coupled to the third terminal of the seventh switch, and a second terminal coupled to the ground.

15. The device of claim 10, wherein the first current mirror unit comprises:

a third P-type metal-oxide-semiconductor transistor having a first terminal for receiving a first voltage, a second terminal, and a third terminal coupled to the second terminal of the third P-type metal-oxide-semiconductor transistor;

a fourth P-type metal-oxide-semiconductor transistor having a first terminal for receiving the first voltage, a second terminal coupled to the second terminal of the third P-type metal-oxide-semiconductor transistor, and a third terminal coupled to the second current mirror unit, wherein the fourth P-type metal-oxide-semiconductor transistor is used for mirroring the first current to generate a second current;

a second N-type metal-oxide-semiconductor transistor having a first terminal coupled to the third terminal of the third P-type metal-oxide-semiconductor transistor, a second terminal coupled to the first voltage generation unit, and a third terminal;

a second resistor having a first terminal coupled to the third terminal of the second N-type metal-oxide-semiconductor transistor, and a second terminal coupled to the ground, wherein the second resistor, the first node voltage, and a threshold voltage of the second N-type metal-oxide-semiconductor transistor are used for generating the first current;

a fifth P-type metal-oxide-semiconductor transistor having a first terminal for receiving the first voltage, a second terminal coupled to the second terminal of the third P-type metal-oxide-semiconductor transistor, and a third terminal for outputting the second voltage, wherein the fifth P-type metal-oxide-semiconductor transistor is used for mirroring the first current to generate a third current, and the third current is a third predetermined times to the first current; and a third resistor having a first terminal coupled to the third terminal of the fifth P-type metal-oxide-semiconductor transistor, and a second terminal coupled to ground, wherein the third resistor generates the second voltage according to the third current.

16. The device of claim 10, wherein the second current mirror unit comprises:

a third N-type metal-oxide-semiconductor transistor having a first terminal coupled to the first current mirror unit for receiving a second current, a second terminal coupled to the first terminal of the third N-type metal-oxide-semiconductor transistor, and a third terminal coupled to ground; and a fourth N-type metal-oxide-semiconductor transistor having a first terminal coupled to the first voltage generation unit, a second terminal coupled to the first terminal of the third N-type metal-oxide-semiconductor transistor, and a third terminal coupled to the ground, wherein the fourth N-type metal-oxide-semiconductor transistor is used for mirroring the second current to generate the first discharge current, and the first discharge current is a second predetermined times to the second current.

17. The device of claim 10, further comprising:

a peak value limiter, comprising:

a voltage limiting generation circuit, comprising:

a first comparator for generating a first comparison signal according to the second voltage and a peak value reference voltage;

a charge pump coupled to the first comparator for generating a limit voltage according to the first comparison signal and a gate control signal of the power switch of the primary side of the power converter; and a predetermined voltage generator coupled to the charge pump for setting an output terminal of the charge pump at a reference voltage according to the reference voltage when the device is powered on; and a gate control signal generator, comprising:

a second comparator for generating a second comparison signal according to a detection voltage and the limit voltage; and a D flip-flop for generating the gate control signal of the power switch of the primary side of the power converter according to the second comparison signal, a clock and an input signal.

18. The device of claim 10, further comprising:

an over-current protection unit, comprising:

a third comparator for generating a third comparison signal according to an over-current protection voltage and the second voltage; and a counter for counting the third comparison signal and generating an over-current protection signal accordingly to the power switch of the primary side of the power converter.

19. A method for detecting an average output current of a power converter, the method comprising:

generating a first charge current according to an intermediate voltage, wherein the intermediate voltage corresponds to the average output current of a secondary side of the power converter;

generating a first node voltage according to the first charge current, a first discharge current, a discharge time, and an inverse discharge time;

generating a first current according to the first node voltage;

generating the first discharge current according to the first current; and generating a second voltage according to the first current, wherein the second voltage corresponds to the average output current of the secondary side of the power converter.

20. The method of the claim 19, wherein the discharge time is a discharge time of the secondary side of the power converter.

21. The method of the claim 19, wherein the first charge current is greater than the first discharge current.

22. The method of the claim 19, further comprising:

setting the intermediate voltage to be between a maximum value and a minimum value of a detection voltage during a turning-on time of a power switch of a primary side of the power converter when the power converter is powered on;

generating a first variable turning-on time according to the detection voltage, the intermediate voltage, and the turning-on time, wherein a second variable turning-on time is equal to the turning-on time minus the first variable turning-on time; and adjusting the intermediate voltage according to the first variable turning-on time, the second variable turning-on time, the turning-on time, a charge current, and a discharge current, wherein the average output current corresponds to the intermediate voltage.

23. The method of the claim 22, wherein the charge current is greater than the discharge current.

24. A method for detecting an output current of a power converter, the method comprising:

setting an intermediate voltage to be between a maximum value and a minimum value of a detection voltage during a turning-on time of a power switch of a primary side of the power converter when the power converter is powered on;

generating a first variable turning-on time according to the detection voltage, the intermediate voltage, and the turning-on time, wherein a second variable turning-on time is equal to the turning-on time minus the first variable turning-on time; and adjusting the intermediate voltage according to the first variable turning-on time, the second variable turning-on time, the turning-on time, a charge current, and a discharge current, wherein the output current corresponds to the intermediate voltage.

25. The method of claim 24, wherein generating the first variable turning-on time according to the detection voltage, the intermediate voltage, and the turning-on time comprises:

generating a comparison signal according to the detection voltage and the intermediate voltage; and generating the first variable turning-on time according to the comparison signal and the turning-on time.

26. The method of claim 25, wherein adjusting the intermediate voltage according to the first variable turning-on time, the second variable turning-on time, the turning-on time, the charge current, and the discharge current comprises:

increasing the intermediate voltage according to the first variable turning-on time, the turning-on time, the charge current, and the discharge current when the first variable turning-on time is greater than the second variable turning-on time.

27. The method of claim 26, wherein increasing the intermediate voltage according to the first variable turning-on time, the turning-on time, the charge current, and the discharge current comprises:

increasing a voltage of a node according to the first variable turning-on time, the turning-on time, the charge current, and the discharge current; and increasing the intermediate voltage according to the voltage of the node.

28. The method of claim 25, wherein adjusting the intermediate voltage according to the first variable turning-on time, the second variable turning-on time, the turning-on time, the charge current, and the discharge current comprises:

decreasing the intermediate voltage according to the first variable turning-on time, the turning-on time, the charge current, and the discharge current when the first variable turning-on time is less than the second variable turning-on time.

29. The method of claim 28, wherein decreasing the intermediate voltage according to the first variable turning-on time, the turning-on time, the charge current, and the discharge current comprises:

decreasing a voltage of a node according to the first variable turning-on time, the turning-on time, the charge current, and the discharge current; and decreasing the intermediate voltage according to the voltage of the node.

30. The method of claim 24, wherein the intermediate voltage is equal to a half of a sum of the maximum value and the minimum value when the first variable turning-on time is equal to the second variable turning-on time.

31. The method of claim 24, wherein the first variable turning-on time is less than the second variable turning-on time when the intermediate voltage is greater than a half of a sum of the maximum value and the minimum value, and the first variable turning-on time is greater than the second variable turning-on time when intermediate voltage is less than the half of the sum of the maximum value and the minimum value.

32. The method of claim 24, wherein the charge current is greater than the discharge current.

* * * * *